United States Patent
Newmoyer

[11] Patent Number: 5,814,406
[45] Date of Patent: Sep. 29, 1998

[54] COMMUNICATION CABLE FOR USE IN A PLENUM

[75] Inventor: Kerry Newmoyer, Denver, Pa.

[73] Assignee: Alcatel NA Cable Systems, Inc., Claremont, N.C.

[21] Appl. No.: 910,311

[22] Filed: Aug. 13, 1997

Related U.S. Application Data

[63] Continuation of Ser. No. 569,847, Dec. 8, 1995, abandoned.

[51] Int. Cl.$^6$ .................................................. B32B 15/00
[52] U.S. Cl. .......................... 428/379; 428/377; 428/375; 428/372; 428/378; 428/383; 114/113 R; 114/110 SR; 114/110 PM; 114/120 SR; 174/121 A
[58] Field of Search ..................................... 428/375, 378, 428/379, 383, 372; 174/110 SR, 110 PM, 120 SR, 113 R, 121 A, 110 A

[56] References Cited

U.S. PATENT DOCUMENTS

| | | | |
|---|---|---|---|
| 3,433,890 | 3/1969 | Gabriel et al. | 174/116 |
| 3,678,177 | 7/1972 | Lawrenson | 174/113 C |
| 4,408,443 | 10/1983 | Brown et al. | 174/34 |
| 4,412,094 | 10/1983 | Dougherty et al. | 174/110 |
| 4,423,589 | 1/1984 | Hardin et al. | 57/293 |
| 4,446,689 | 5/1984 | Hardin et al. | 57/204 |
| 4,500,748 | 2/1985 | Klein | 174/121 |
| 4,605,818 | 8/1986 | Arroyo et al. | 174/107 |
| 4,687,294 | 8/1987 | Angeles | 350/96.23 |
| 4,697,051 | 9/1987 | Beggs et al. | 174/34 |
| 4,755,629 | 7/1988 | Beggs et al. | 174/34 |
| 4,849,135 | 7/1989 | Reitz . | |
| 4,869,848 | 9/1989 | Hasegawa et al. . | |
| 4,873,393 | 10/1989 | Friesen et al. | 174/34 |
| 4,941,729 | 7/1990 | Hardin et al. | 350/96.23 |
| 4,969,706 | 11/1990 | Hardin et al. | 350/96.23 |
| 5,001,304 | 3/1991 | Hardin et al. | 174/107 |
| 5,010,210 | 4/1991 | Sidi et al. | 174/34 |
| 5,024,506 | 6/1991 | Hardin et al. | 350/96.23 |
| 5,059,651 | 10/1991 | Ueno . | |
| 5,074,640 | 12/1991 | Hardin et al. | 385/109 |
| 5,162,609 | 11/1992 | Adriaenssens et al. | 174/34 |
| 5,173,960 | 12/1992 | Dickerson | 174/121 A |
| 5,202,946 | 4/1993 | Hardin et al. | 385/109 |
| 5,211,746 | 5/1993 | Keogh et al. . | |
| 5,253,317 | 10/1993 | Allen et al. | 385/109 |
| 5,298,680 | 3/1994 | Kenny | 174/36 |
| 5,378,539 | 1/1995 | Chen . | |
| 5,378,856 | 1/1995 | Allen | 174/121 A |

FOREIGN PATENT DOCUMENTS

| | | |
|---|---|---|
| 0380245 | 8/1990 | European Pat. Off. . |
| 2518621 | 10/1976 | Germany . |
| 5665407 | 6/1981 | Japan . |

OTHER PUBLICATIONS

Underwriter's Laboratory Standard 910 Paper "National Electrical Code and Related Flame Test".
Study Sponsored by the National Electrical Manufactures Association, Wire and Cable Division.
"Reduced Emissions Plenum Cable Telephone Jacket Compounds", Internation Wire & Cable Symposium Proceedings, 1987, pp. 592–597.

*Primary Examiner*—Newton Edwards
*Assistant Examiner*—J. M. Gray
*Attorney, Agent, or Firm*—Ware, Fressola, Van der Sluys & Adolphson LLP

[57] ABSTRACT

A communication cable includes a plurality of twisted pairs of electrical conductors, all electrical conductors being surrounded by a layer of a modified olefin based material.

25 Claims, 1 Drawing Sheet

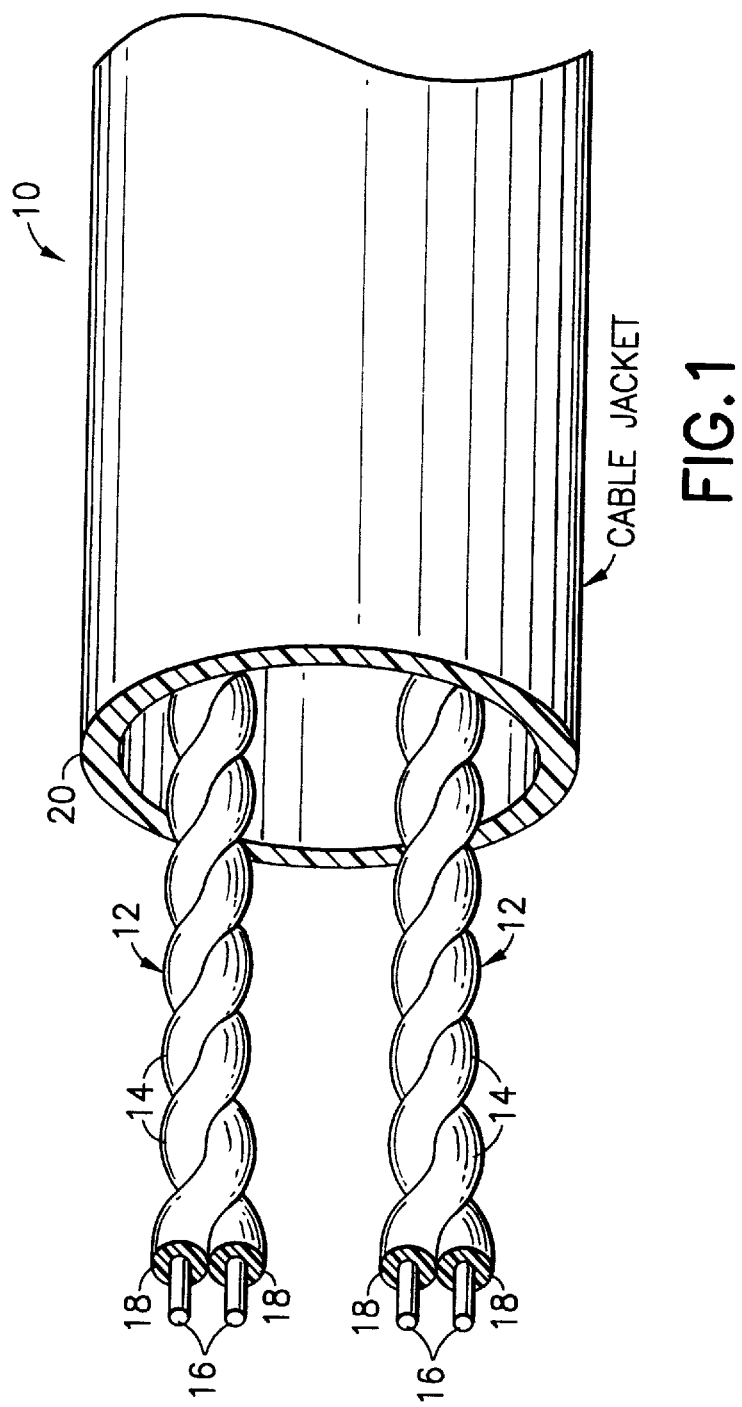

5,814,406

COMMUNICATION CABLE FOR USE IN A PLENUM

This application is a continuation of application Ser. No. 08/569,847 filed on Dec. 8, 1995 now abandoned.

TECHNICAL FIELD

The present invention generally relates to a communication cable for use in a plenum, and, in particular, relates to one such communication cable having a plurality of twisted pairs of electrical conductors, each electrical conductor having a modified olefin material as insulation therefor.

DESCRIPTION OF THE PRIOR ART

As communications and communications services have increased, it has become necessary to provide communication cables in larger and larger numbers. This is particularly true in office buildings where more and more communications services are being demanded. Typically, rather than rewire an existing building, it has been found more economical to provide the needed communications services by running the communications cables in plenums. In general, a plenum is defined as a compartment or chamber to which one or more air ducts are connected and which forms part of the air distribution system. Generally, in existing buildings, plenums are readily formed by providing drop ceilings, which is typically a return air plenum in a facility being rewired. Another alternative is to create a plenum beneath a raised floor of a facility.

From the above it is readily understood why it would be very advantageous to utilize a wiring scheme within these fairly accessible places. However, since these plenums handle environmental air, considerable concern regarding a fire incidence is addressed in the National Electric Code by requiring that communication cables for use in plenums pass a stringent flame and smoke evaluation. Consequently, in the manufacture of communication cables, the fire resistant ratings which allow for installation within certain areas of a building are of primary importance.

Currently, communication cables for use in plenums must meet the requirements of the Underwriters Laboratory Standard 910 which is a Test Method for Fire and Smoke Characteristics of Cables used in Air-Handling Spaces. This is a well known test performed in a modified Steiner Tunnel. During the test, a single layer of twenty four foot lengths of cable are supported on a one foot wide cable rack which is filled with cables. The cables are ignited with a 300,000 BTU/hr methane flame located at one end of the furnace for a duration of 20 minutes. Flame spread is aided by a 240 ft/min draft. Flame spread is then monitored through observation windows along the side of the tunnel while concurrently monitoring smoke emissions through photo cells installed within the exhaust duct.

The above-described Steiner Tunnel test is a severe test that to date has been passed by communication cables using premium materials such as low smoke materials, for example, Fluroethylenepropylene (FEP), Ethylenechlorotrifluorothylene (ECTFE), or Polyvinylidene fluoride (PVDF). In general, cables passing this test are approximately three times more expensive than a lower rated cable design for the same type of application. However, communication cables falling to meet this test must be installed within conduit, thereby eliminating the benefits of an economical, easily relocatable scheme.

The manufacturing techniques and the materials used for the manufacture of communication cables are well known. For example, as described above, it is well known to use fluropolymers such as FEP, ECTFE, or PVDF in the manufacture of a communication cable because such material does not contribute significantly to flame spread and smoke evolution. Commercially available fluorine-containing polymer materials have been accepted as the primarily insulated material covering for conductors and as jacketing material for plenum cables without the use of metal conduit. Additionally, recent progress has been made using Polyvinyl chloride (PVC) or alloys of PVC and such other compounds as ethylene-vinyl acetate (EVA), eethylene-ethyl acrylate (EEA), NBR and CPE. These compounds typically demonstrate very poor electrical qualities making them unsuitable as a primary insulation in high data-rate communications cables.

In general, the manufacture of communication cables are well known, for example, U.S. Pat. No. 4,423,589, issued to Hardin et al. on Jan. 3, 1984 discloses a method of manufacturing a communications cable by forming a plurality of wire units by advancing groups of twisted wire pairs through twisting stations. Further, U.S. Pat. No. 4,446,689 issued to Hardin et al. on May 8, 1984 relates to an apparatus for manufacturing a communications cable wherein disc frames are provided with aligned apertures in which faceplates movably mounted. During operation, the faceplates are modulated in both frequency and amplitude.

The current materials for use in communications are also well known, for example, U.S. Pat. No. 5,001,304 issued to Hardin et al. on Mar. 19, 1991 relates to a building riser cable having a core which includes twisted pairs of metal conductors. Therein the insulating covers are formed from a group of non-halogenated plastic materials including polyolefin. It should be noted however, that all of the insulating covers are the same and that the flame test used for riser cables is much less severe than the flame test used for plenum cables.

U.S. Pat. No. 5,024,506 issued to Hardin et al. on Jun. 18, 1991 discloses a plenum cable that includes non-halogenated plastic materials. The insulating material about the metallic conductors is a polyetherimide. Again the insulating material is the same for all of the conductors. Further, in U.S. Pat. No. 5,074,640 issued to Hardin et al. on Dec. 24, 1991 a plenum cable is described that includes an insulator containing a polyetherimide and an additive system including an antioxidant/thermal stabilizer and a metal deactuator. As is the convention, the insulator is the same for all of the metallic conductors.

U.S. Pat. No. 5,202,946 issued to Hardin et al. on Apr. 13, 1993 describes a plenum cable wherein the insulation includes a plastic material. The insulation is the same for all of the conductors within the plenum cable. European Patent 0 380 245 issued to Hardin et al. describes another plenum cable having insulation about the metallic conductors that, in this case, is a plastic material including a polyetherimide. As is the convention the insulation is the same for all of the conductor.

Further, U.S. Pat. No. 4,941,729 describes a cable that is intended as a low hazard cable. This patent describes a cable that includes a non-halogenated plastic material. Similarly, U.S. Pat. No. 4,969,706 describes a cable that includes both halogenated and non-halogenated plastic materials. In both patents the insulating material about the twisted pairs of conductors is the same for each cable.

U.S. Pat. No. 4,412,094 issued to Dougherty et al. on Oct. 25, 1983 relates to a riser cable having a composite insulator having an inner layer of expanded polyethylene and an outer layer of a plasticized polyvinyl chloride. All of the conductors include the same composite insulator.

U.S. Pat. No. 4,500,748 issued to Klein on Feb. 19, 1985 relates to a flame retardant plenum cable wherein the insulation and the jacket are made from the same or different polymers to provide a reduced amount of halogens. This reference tries to predict, mathematically, the performance of cables within the Steiner tunnel. The method does not include fuel contributions or configurations of designs. Further, synergistic effects are not addressed. In each embodiment, the insulation is the same for all of the conductors.

U.S. Pat. No. 4,605,818 issued to Arroyo et al. on Aug. 12, 1986 relates to a flame retardant plenum cable wherein the conductor insulation is a polyvinyl chloride plastic provided with a flame retardant, smoke suppressive sheath system. As is common throughout the known communication cables the conductor insulation is the same for all of the conductors.

U.S. Pat. No. 4,678,294 issued to Angeles on Aug. 18, 1987 relates to a fiber optic plenum cable. The optical fibers are provided with a buffer layer surrounded by a jacket. The cable is also provided with strength members for rigidity.

U.S. Pat. No. 4,849,135 issued to Reitz on Jul. 18, 1989 discloses an ethylene copolymer, such as ethylene with EVA, which is mineral filled with phosphates to achieve a degree of flame retardancy. However, the disclosed compound does not address the smoke or electrical performance requirements of a compound intended for use in a plenum cable. Similarly, U.S. Pat. No. 5,059,651 issued to Ueno on Oct. 22, 1991 discloses an insulating material using EVA with various mineral fillers to achieve flame retardancy and smoke suppression. However, Ueno does not consider electrical characteristics or the requirements of Underwriters Laboratory Standard 910 (Test Method for Fire and Smoke Characteristics of Cables used in Air-Handling Spaces). U.S. Pat. No. 5,378,856 issued to Allen on Jan. 3, 1995 also discloses the use of EVA in wire insulation. In particular, Allen discloses insulation formed from a blend of non-halogenated polyethylene and non-halogenated EVA which is mineral filled for non-plenum applications. This insulation material also suffers from relatively poor electrical performance.

U.S. Pat. No. 4,869,848 to Hasegawa et al. on Sep. 26, 1989 discloses a non-halogen crosslinked rubber or plastic using magnesium hydroxide as a filler for use as the insulation on the conductors of a cable. While the smoke characteristics of this cable are measured in conformity with JIS A-1306, this is a different, less sever test than the Underwriters Laboratory Standard 910 (Test Method for Fire and Smoke Characteristics of Cables used in Air-Handling Spaces).

U.S. Pat. No. 5,010,210 issued to Sidi et al. on Apr. 23, 1991 describes a non-plenum telecommunications cable wherein the insulation surrounding each of the conductors is formed from a flame retardant polyolefin base compound.

U.S. Pat. No. 5,162,609 issued to Adriaenssens et al. on Nov. 10, 1992 relates to a fire-resistant non-plenum cable for high frequency signals. Each metallic member has an insulation system. The insulation system includes an inner layer of a polyolefin and an outer layer of flame retardant polyolefin plastic.

U.S. Pat. No. 5,173,960 issued to Dickinson on Dec. 22, 1992 discloses a cable wherein individual conductors in the core of the cable are insulated with a plastic material having a relatively low dielectric constant. The core is surrounded with a jacket made of material which includes first and second oxide constituents that melt at different temperatures, thereby forming ceramic-like protective layers to insulate the cable core from heat and minimize the release of smoke and combustible gases from the core insulation material.

U.S. Pat. No. 5,211,746 issued to Keogh et al. on May 18, 1993 discloses a flame retardant composition including polyethylene with treated magnesium hydroxide filler for low temperature applications.

U.S. Pat. No. 5,253,317 issued to Allen et al. on Oct. 12, 1993 describes a non-halogenated plenum cable including twisted pairs of insulated metallic conductors. The insulating material is a non-halogenated sulfone polymer composition. The insulating material is the same for all of the metallic conductors.

U.S. Pat. No. 5,378,539 discloses a blend of non-halogen ethylene copolymers, polyethylene, metal hydroxides and a coupling agent which is slightly crosslinked prior to extrusion improve physical properties of the compound. However, this compound exhibits relatively poor electrical performance.

It can thus be understood that much work has been dedicated to providing not only communication cables that meet certain safety requirements but meet electrical requirements as well. Nevertheless, the most common communication cable that is in widest use today includes a plurality of twisted pairs of electrical conductors each having an insulation of FEP, which is a very high temperature material and possesses those electrical characteristics, such as, low dielectric constant and dissipation factor, necessary to provide high quality communications cable performance. However, fluropolymer materials are somewhat difficult to process especially for insulation covers. Also, some fluorine-containing materials have a relatively high dielectric constant which makes them unattractive as insulation for communication conductors. Additionally, a fluropolymer is a halogenated material. Such halogenated materials exhibit undesirable levels of corrosion. For example, if a fluropolymer is used, hydrogen fluoride forms under the influence of heat, causing corrosion and a level of toxicity which is not as low as desired. Finally, such fluropolymer material is quite expensive and is frequently in short supply.

Consequently, the provision of a communication cable for use in a plenum which can be manufactured at a reduced cost without the use of fluropolymer and expensive plastic material is highly desired.

SUMMARY OF THE INVENTION

An object of the present invention is to provide a communication cable for use in a plenum having a plurality of twisted pairs of electrical conductors, wherein all of the electrical conductors have a surrounding layer of electrical insulation formed from a modified olefin base material.

According to one aspect of the present invention, a communication cable is provided containing a plurality of twisted pairs of electrical conductors, each electrical conductor having a surrounding layer of electrical insulating material formed from a modified olefin based material.

In accordance with one aspect of the present invention, each electrical conductor of the cable is insulated with an olefin material which has been suitably modified to meet the requirements of a plenum rated material. In particular, each conductor is coated with a polypropylene which is filled with minerals and char enhancers such that the polypropylene meets the flame and smoke requirements of a plenum rated material.

For purposes hereof, the phrase "plenum rated material" includes those materials that would allow a cable to pass standard industry plenum tests if it were used as the insulation on all of the twisted pairs of electrical conductors of a cable. Correspondingly, the phrase "non-plenum rated material" includes those material that would significantly contribute to a cable failing the standard industry plenum test if it were used as the insulation on all of the twisted pairs of electrical conductors of a cable. Typically, these non-plenum materials provide too much fuel contribution to the flame test either through a low melting point or a high fuel content or a combination of these factors. Non-plenum materials may also contribute excessively to the smoke generation of the cable under test, rendering the cable unsuitable for plenum applications.

In further accord with the present invention, the insulation material may contain lubricants and stabilizers. Additionally, the compound may contain polyethylene for use as a process aid. Additionally, smoke suppression materials may be added to the insulation material. Suitable smoke suppression materials may include zinc oxide or zinc borate.

The present invention provides a significant improvement over the prior art because a communication cable for use in a plenum is provided which includes electrical conductors which are insulated with an olefin material. The olefin provides superior electrical characteristics and mechanical qualities to the cable. Additionally, the olefin material has been suitably modified with minerals and char enhancers such that it meets the requirements of plenum rated material. Therefore, the communication cable of the invention may be used in a plenum without a metal conduit surrounding the cable. Additionally, a communication cable which may be manufactured at a very low cost as compared to the prior art is provided.

The foregoing and other objects, features and advantages of the present invention will become more apparent in light of the following detailed description of exemplary embodiments thereof, as illustrated in the accompanying drawing.

BRIEF DESCRIPTION OF THE DRAWING

FIG. 1 is a perspective view of a communication cable, not drawn to scale, embodying the principals of the present invention.

DETAILED DESCRIPTION OF THE INVENTION

Referring to FIG. 1, a communication cable 10 embodying the principals of the present invention includes a plurality of twisted pairs 12 of electrical conductors 14. Each electrical conductor 14 includes a central metal conductor 16, such as a copper wire, surrounded by a layer 18 of insulation material. These twisted pairs 12 are surrounded by a cable jacket 20.

Each of the twisted pairs 12 is provided with a twist length. The twist length of each of the twisted pairs may be identical, or alternatively, varying twist lengths may be used for the different twisted pairs 12.

In one specific embodiment of the invention, the communication cable 10 includes twisted pairs 12 each having electrical conductors 14 with a nominal diameter of about 0.038 inches. This includes the central metal conductor 16 having a nominal diameter of about 0.0208 inches and a layer of insulation 18 having a thickness of about 0.009 inches.

Preferably, the layer 18 of insulation material of the twisted pair 12 is a modified olefin material which has been suitably modified to meet the requirements of a plenum rated material. This means that the insulation 12 has been tested in accordance with the requirements of Underwriters Laboratory Standard 910 (Test Method for Fire and Smoke Characteristics of a Cable Used in Air-Handling Spaces) and has passed the requirements of the test such that the material may be used in a plenum without a metal conduit. For example, the insulation material may be an olefin which has been heavily filled with minerals and char enhancers. In particular, the insulation material 18 is a polypropylene material which is heavily filled with minerals and char enhancers.

The preferred formulation for the insulation material 18 is given below in Table I in parts by weight. The components of the insulation material 18 were combined in a twin screw extruder. The pelletized insulating material was then extruded over the metal conductors.

TABLE I

| INSULATION MATERIAL | PARTS PER HUNDRED |
|---|---|
| POLYPROPYLENE | 100 |
| MINERAL FILLER | 50 to 150 |
| FLAME RETARDANT | 0 to 30 |
| LUBRICANTS | .10 to 5 |
| STABILIZERS | .10 to 5 |
| POLYETHYLENE | 0–75 |

For example, one olefin material suitably modified to form the insulation material of the present invention is a mineral filled polypropylene including 15 parts per hundred halogenated flame retardant, 120 parts per hundred mineral filler, and 5 parts per hundred silicate char enhancers such as talc. Suitable mineral fillers include magnesium carbonate or magnesium hydroxide (treated with coupling agents). Other suitable mineral fillers, such as calcium carbonate, may be used. The halogenated flame retardant may be a brominated flame retardant, such as decabromodiphenyloxide. Alternatively, a chlorinated flame retardant such as DECLORANE may be used. The compound also contains small percent lubricants such as waxes or stearates and stabilizers such as tetrakismethylene (3,5-di-t-buyl-4-hydroxhydrocinnamate) methane. Additionally, the compound may contain less than 10% by weight polyethylene which may be used as a process aid. In addition to silicate char enhancers, other char formers may be used such as Polytetrafluorethylene (PIFE), Nitrogen-Phosphate or Ammonium-Polyphosphate. The smoke suppression of the compound may also be enhanced with a suitable compound, such as a zinc compound.

It has been found that olefin materials, and in particular, polypropylene materials, modified as described above, provide the required flame retardancy and smoke suppression as well as reducing the fuel load to pass the requirements of the Stiener Tunnel Test (Underwriters Laboratories Test 910), while at the same time maintaining superior electrical performance.

In particular, it has been found that the cable of the present invention does not compromise electrical performance of the communication cable 10 due to the very good electrical and mechanical properties of the base olefin material. In fact, it has been found that for cables having the fluropolymer coating of the prior art a weakness exists that the electrical conductors having the shortest twist length, i.e., the tightest twist, generally approach the signal attenuation failure limit for electrical test of the cables. Usually this is within about two percent of the passing level. In contrast, the cable of the present invention provided with modified olefin insulation material on all of the electrical conductors, the signal attenuation is improved due to the added ruggedness of the olefin material as compared to standard fluropolymer type insulation.

In the preferred embodiment, the communication cable 10 includes a cable jacket 20 that encases the plurality of twisted pairs 12. Preferably, the cable jacket is formed from polymer alloys. Alternatively, other material such as Polyvinyl chloride (PVC), chlorinated PVC, or Ethylene-Trichlorofluoroethylene (E-CTFE) may be used with the cable of the present invention and still meet the required flame retardancy, smoke suppression, as well as reduced fuel load required for use in a plenum.

Although the invention has been described and illustrated with respect to exemplary embodiments thereof, it will be understood by those skilled in the art that various additions and omissions may be made therein and thereto without departing from the spirit and scope of the present invention.

What is claimed is:

1. A communication cable for use in a plenum, said cable comprising:
    a plurality of twisted pairs of electrical conductors, each of said electrical conductors of said plurality of twisted pairs having a surrounding layer of electrical insulation formed from a flame retardant modified olefin base material; and
    a jacket surrounding said plurality of twisted pairs of electrical conductors;
    wherein said communication cable does not contain any twisted pairs in addition to said plurality of twisted pairs, and wherein said plurality of twisted pairs contains twisted pairs coated only with said flame retardant modified olefin base material.

2. A communication cable as claimed in claim 1, wherein said modified olefin base material is a modified polypropylene compound.

3. A communication cable as claimed in claim 2, wherein said modified polypropylene compound comprises a mixture having from about 50 to about 150 parts by weight of mineral filler per 100 parts by weight of the modified polypropylene compound and from about 0 to about 30 parts by weight of flame retardant per 100 parts by weight of the modified polypropylene compound.

4. A communication cable as claimed in claim 3, wherein said flame retardant is a halogenated flame retardant.

5. A communication cable as claimed in claim 4, wherein said halogenated flame retardant is decabromodiphenyloxide.

6. A communication cable as claimed in claim 5 wherein said mineral filler is selected from the group consisting of magnesium carbonate and magnesium hydroxide, and wherein said mineral filler is treated with a coupling agent.

7. A communication cable as claimed in claims 6, wherein said modified polypropylene compound further comprises a char enhancer selected from the group consisting of silicate char enhancer, Polytetrafluorethylene (PTFE), Nitrogen-Phosphate and Ammonium-Polyphosphate.

8. A communication cable as claimed in claim 7, wherein said modified polypropylene compound further comprises from about 0 to about 75 parts by weight of polyethylene per 100 parts by weight of the modified polypropylene compound.

9. A communication cable as claimed in claim 8, wherein said modified polypropylene compound further comprises a zinc compound for smoke suppression.

10. A communication cable as claimed in claim 9, wherein said jacket is formed from a polymer alloy.

11. A communication cable as claimed in claim 9, wherein said jacket is formed from a material selected from the group consisting of Polyvinyl chloride (PVC), chlorinated PVC, and Ethylene-Trichlorofluoroethylene (E-CTFE).

12. A communication cable as claimed in claim 9, wherein said modified polypropylene compound further comprises from about 0.10 to about 5 parts by weight of lubricant per 100 parts by weight of the modified polypropylene compound, said lubricant being selected from the group consisting of waxes and stearates.

13. A communication cable as claimed in claim 12, wherein said modified polypropylene compound further comprises from about 0.10 to about 5 parts by weight of stabilizer per 100 parts by weight of the modified polypropylene compound.

14. A communication cable as claimed in claim 6, wherein said modified polypropylene compound further comprises from about 0 to about 75 parts by weight of polyethylene per 100 parts by weight of the modified polypropylene compound.

15. A communication cable as claimed in claim 6, wherein said modified polypropylene compound further comprises a zinc compound for smoke suppression.

16. A communication cable as claimed in claim 3 wherein said mineral filler is selected from the group consisting of magnesium carbonate and magnesium hydroxide, and wherein said mineral filler is treated with a coupling agent.

17. A communication cable as claimed in claim 3 wherein said mineral filler is calcium carbonate.

18. A communication cable as claimed in claim 3, wherein said modified polypropylene compound further comprises a char enhancer.

19. A communication cable as claimed in claim 18, wherein said char enhancer is selected from the group consisting of silicate char enhancer, Polytetrafluorethylene (PTFE), Nitrogen-Phosphate and Ammonium-Polyphosphate.

20. A communication cable as claimed in claim 3, wherein said modified polypropylene compound further comprises from about 0.10 to about 5 parts by weight of lubricant per 100 parts by weight of the modified polypropylene compound, said lubricant being selected from the group consisting of waxes and stearates.

21. A communication cable as claimed in claim 3, wherein said modified polypropylene compound further comprises from about 0.10 to about 5 parts by weight of stabilizer per 100 parts by weight of the modified polypropylene compound.

22. A communication cable as claimed in claim 3, wherein said modified polypropylene compound further comprises from about 0 to about 75 parts by weight of polyethylene per 100 parts by weight of the modified polypropylene compound.

23. A communication cable as claimed in claim 3, wherein said modified polypropylene compound further comprises a zinc compound for smoke suppression.

24. A communication cable as claimed in claim 1, wherein said jacket is formed from a polymer alloy.

25. A communication cable as claimed in claim 1, wherein said jacket is formed from a material selected from the group consisting of Polyvinyl chloride (PVC), chlorinated PVC, and Ethylene-Trichlorofluoroethylene (E-CTFE).

* * * * *